US007571537B2

(12) United States Patent
Adams et al.

(10) Patent No.: US 7,571,537 B2
(45) Date of Patent: Aug. 11, 2009

(54) POWERED STAPLER

(75) Inventors: David P. Adams, Barrington, IL (US); Joel G. Delman, Chicago, IL (US); Linda Pulik, Chicago, IL (US); Melanie Lyn Conklin, Brooklyn, NY (US); Clifford Krapfl, Chicago, IL (US); Cory William Worth, San Francisco, CA (US); Stephen John Gaynes, McHenry, IL (US); Michael F. De Rossi, Lindenhurst, IL (US)

(73) Assignee: ACCO Brands USA LLC, Lincolnshire, IL (US)

(*) Notice: Subject to any disclaimer, the term of this patent is extended or adjusted under 35 U.S.C. 154(b) by 575 days.

(21) Appl. No.: 11/110,643

(22) Filed: Apr. 20, 2005

(65) Prior Publication Data

US 2005/0242150 A1 Nov. 3, 2005

Related U.S. Application Data

(60) Provisional application No. 60/563,855, filed on Apr. 20, 2004.

(51) Int. Cl.
*B23P 21/00* (2006.01)
*B25C 5/02* (2006.01)

(52) U.S. Cl. ........................................ 29/715; 227/7

(58) Field of Classification Search .................. 29/432, 29/709, 715, 712, 714, 757, 758, 270; 227/7, 227/131, 5, 6, 155, 156
See application file for complete search history.

(56) References Cited

U.S. PATENT DOCUMENTS

| | | | |
|---|---|---|---|
| 3,971,969 | A | 7/1976 | Wines et al. |
| 4,558,391 | A | 12/1985 | Ward et al. |
| 4,589,581 | A | 5/1986 | Balma |
| 4,610,386 | A | 9/1986 | Augostini |
| 4,726,505 | A | 2/1988 | Okazaki |
| 4,807,793 | A | 2/1989 | Ghibely |
| 4,940,177 | A | 7/1990 | Jimena |
| 5,007,572 | A | 4/1991 | Chung-Cheng |

(Continued)

FOREIGN PATENT DOCUMENTS

| | | |
|---|---|---|
| EP | 0242021 | 10/1987 |

(Continued)

OTHER PUBLICATIONS

International Search Report and Written Opinion issued on Mar. 30, 2006 for corresponding International Application No. PCT/US2005/13861.

*Primary Examiner*—John C Hong
(74) *Attorney, Agent, or Firm*—Michael Best & Friedrich LLP

(57) ABSTRACT

A powered stapler includes a housing having a first housing portion and a second housing portion movably coupled to the first portion. The stapler is actuated by creating relative movement between the first and second housing portions. The second housing portion includes an elongated trigger member, that when moved relative to the first housing portion, actuates the powered stapler to drive a staple into a stack of sheets. The stapler is configured to be held in a single hand of the user and can be actuated by the user squeezing his or her hand while holding the stapler.

28 Claims, 5 Drawing Sheets

U.S. PATENT DOCUMENTS

| | | | |
|---|---|---|---|
| 5,012,967 | A | 5/1991 | Johansson |
| 5,025,970 | A | 6/1991 | Anderson et al. |
| 5,222,645 | A | 6/1993 | Sueda |
| 5,330,086 | A | 7/1994 | Shimomura et al. |
| 5,427,296 | A | 6/1995 | Chen |
| 5,460,313 | A | 10/1995 | Magnusson et al. |
| 5,474,222 | A | 12/1995 | Kanai et al. |
| 5,657,918 | A | 8/1997 | Shimomura et al. |
| 5,794,833 | A | 8/1998 | Straat |
| 6,068,173 | A | 5/2000 | Sueda |
| 6,135,337 | A | 10/2000 | Harris et al. |
| 6,145,728 | A | 11/2000 | Marks |
| 6,547,119 | B2 | 4/2003 | Huang |
| 6,755,337 | B2 | 6/2004 | Jairam et al. |
| 6,811,070 | B2 | 11/2004 | Takada |
| 7,097,087 | B2 * | 8/2006 | Lammers et al. ............ 227/131 |
| 2004/0016789 | A1 | 1/2004 | Takada |
| 2004/0079782 | A1 | 4/2004 | Luo |
| 2005/0067456 | A1 | 3/2005 | Lammers et al. |
| 2005/0242151 | A1 | 11/2005 | Bargo et al. |
| 2007/0045374 | A1 | 3/2007 | Lammers et al. |

FOREIGN PATENT DOCUMENTS

| | | |
|---|---|---|
| JP | 5084675 | 4/1993 |

* cited by examiner

POWERED STAPLER

RELATED APPLICATIONS

This application claims priority to U.S. Provisional Patent Application No. 60/563,855 filed Apr. 20, 2004, which is hereby incorporated by reference.

FIELD OF THE INVENTION

The invention relates to staplers, and more particularly to powered staplers.

BACKGROUND OF THE INVENTION

Powered staplers are known to be automatically actuated upon insertion of a stack of sheets into a throat of the stapler. Contact switches and photosensors are commonly used to achieve the automatic actuation. It is also known for powered staplers to include an actuation button positioned on the stapler housing. The stapler is actuated when the user depresses the actuation button with his or her finger.

SUMMARY OF THE INVENTION

The invention provides a powered stapler configured to be held in a single hand of the user and that can be actuated by the user squeezing his or her hand while holding the stapler. No separate actuation button must be depressed by the user's finger, and any switch or sensor in the throat of the stapler is not the sole means of actuation. The powered stapler provides the user with the feel, control, and accuracy of existing manual, hand-held staplers, which are squeezed in the user's hand to effect stapling, but without requiring the same amount of human force necessary to drive and clinch the staple.

In one embodiment, the powered stapler includes a housing having a first housing portion and a second housing portion movably coupled to the first portion. The stapler is actuated by creating relative movement between the first and second housing portions. The second housing portion preferably includes an elongated trigger member that, when moved relative to the first housing portion, actuates the powered stapler to drive a staple into a stack of sheets. In the illustrated embodiment, the trigger member is pivotally mounted to the first housing portion. When a user squeezes the stapler, the trigger member pivots with respect to the first housing portion, causing a projection on the underside of the trigger to depress a switch supported within the first housing portion, thereby actuating the stapler.

Other features and advantages of the invention will become apparent to those skilled in the art upon review of the following detailed description and drawings.

Figure 1:
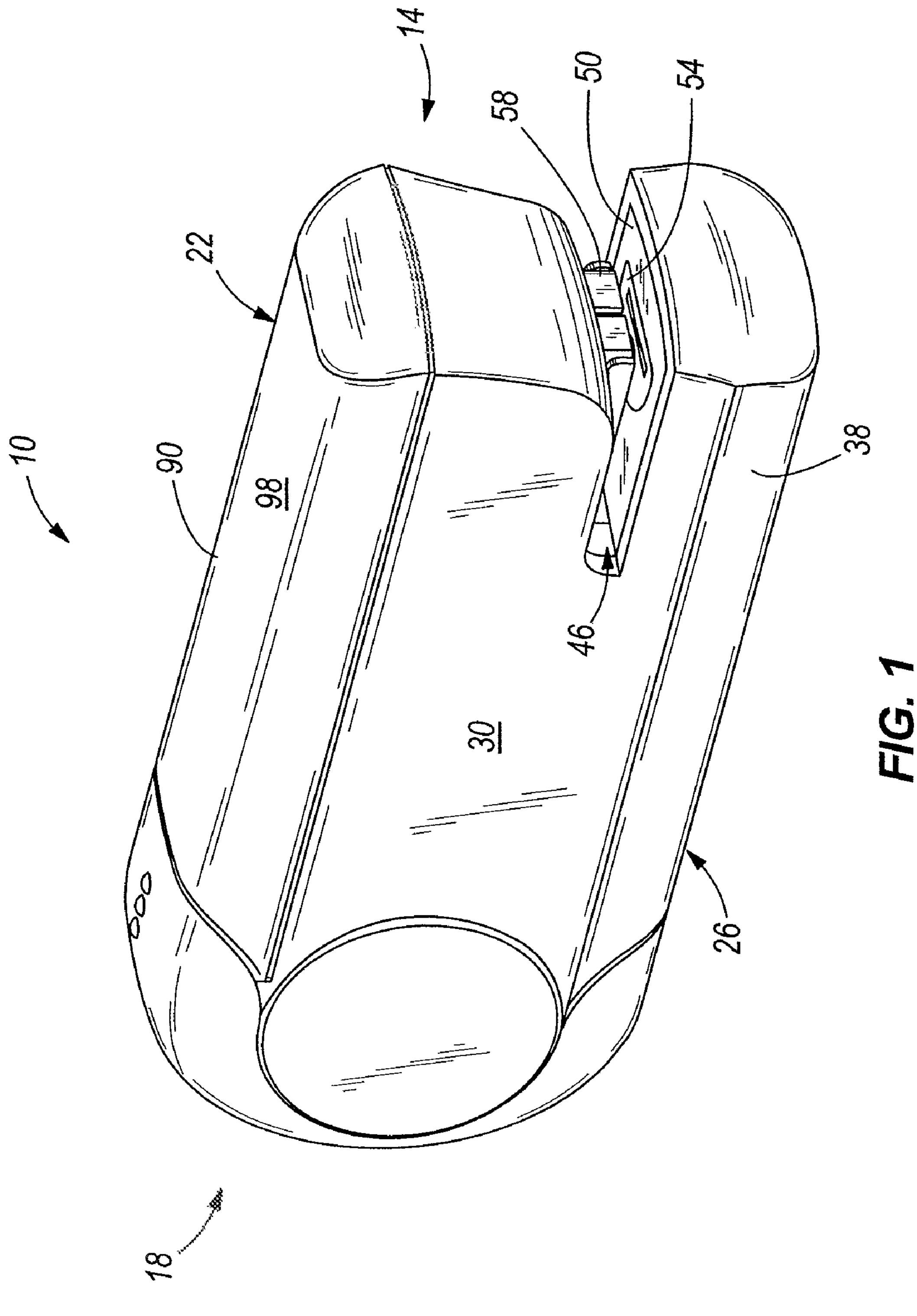
FIG. 1 is a perspective view of a powered stapler embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including", "having", and "comprising" and variations thereof herein is meant to encompass the items listed thereafter and equivalents thereof as well as additional items.

DETAILED DESCRIPTION OF THE PREFERRED EMBODIMENT

FIGS. 1-5 illustrate a powered stapler 10 embodying the invention. The illustrated stapler 10 is sized and configured to be used as a hand-held stapler and does not require, but may have, support legs or other support features commonly associated with desktop-type staplers. Of course, it is understood that the stapler 10 can be positioned on a desktop or other support surface for use.

Figure 5:
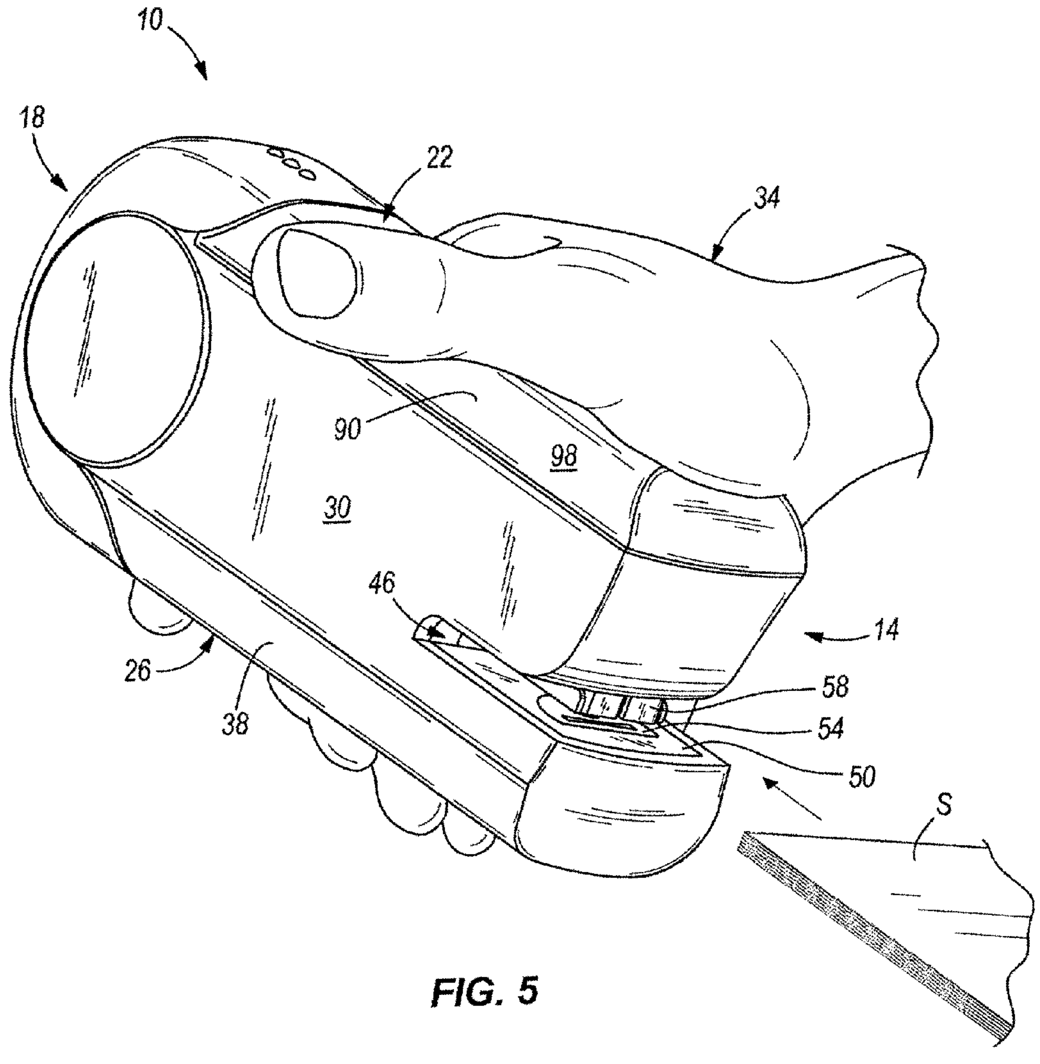
FIG. 5 is a perspective view of the stapler of FIG. 1 being held in a single hand of a user.

The stapler 10 has a front end 14, a rear end 18, a top 22, a bottom 26, and sides 30. As used herein and in any appended claims, the terms top, bottom, front, and rear are for purposes of description only and are not intended to imply a particular orientation of the stapler 10. FIG. 5 illustrates one possible position in which a user's hand 34 can grasp and hold the stapler 10 for use. In addition to this illustrated grasp, a user could also grasp the stapler in other manners.

Figure 2:
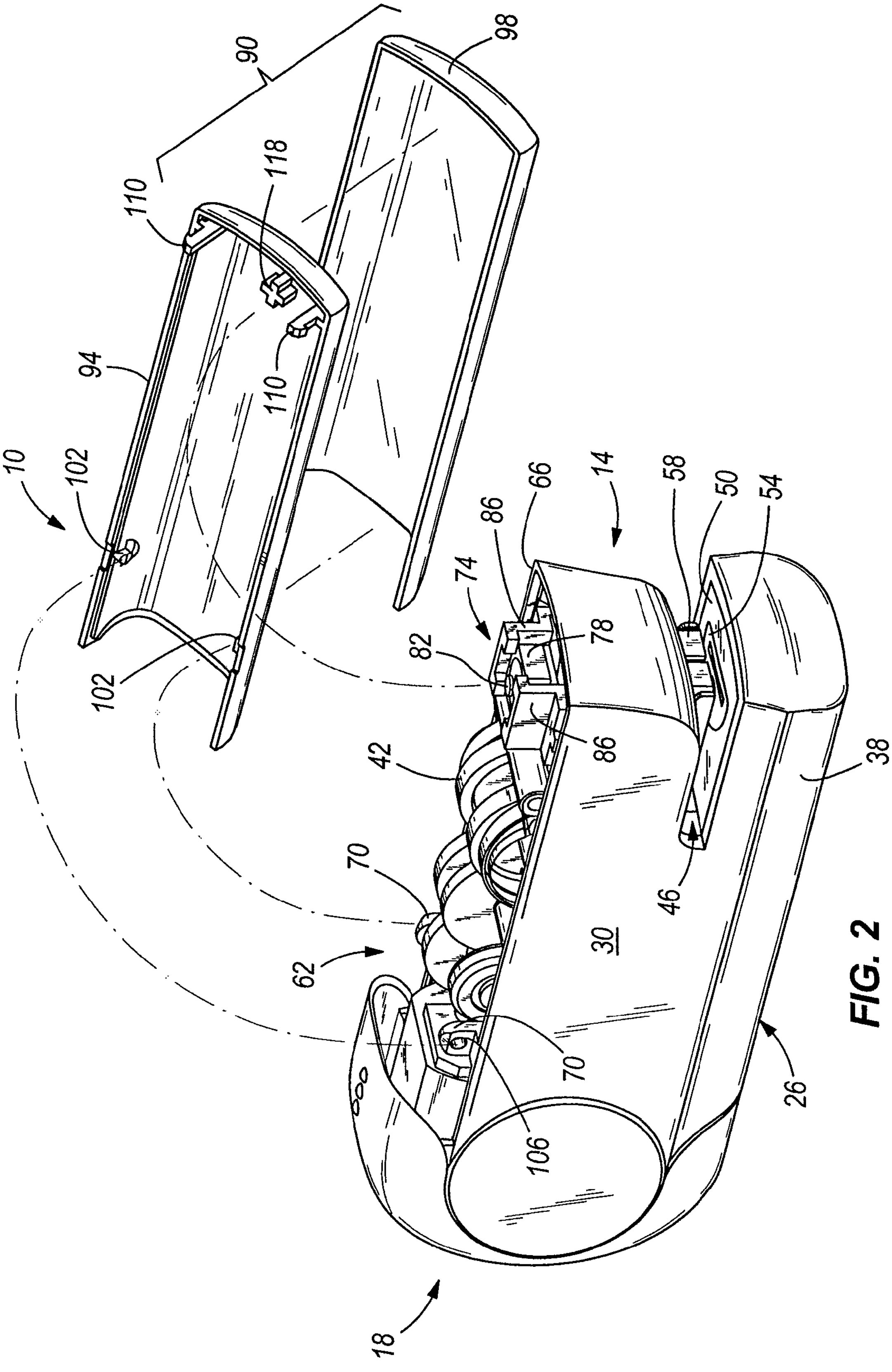
FIG. 2 is a partially exploded view of the stapler of FIG. 1.

The stapler 10 is a powered stapler configured to operate with an AC to DC power source, a DC power source, or both. The illustrated stapler 10 is powered by batteries 35 (see FIGS. 3 and 4), with an optional electrical connector 36 to accept connection with a power cord electrically connected to an AC to DC power supply. As best seen in FIG. 2, the stapler 10 includes a first housing portion 38 that at least partially surrounds and encloses the stapler engine or drive mechanism 42. The drive mechanism 42 can take any suitable form and will not be described in greater detail.

Figure 3:
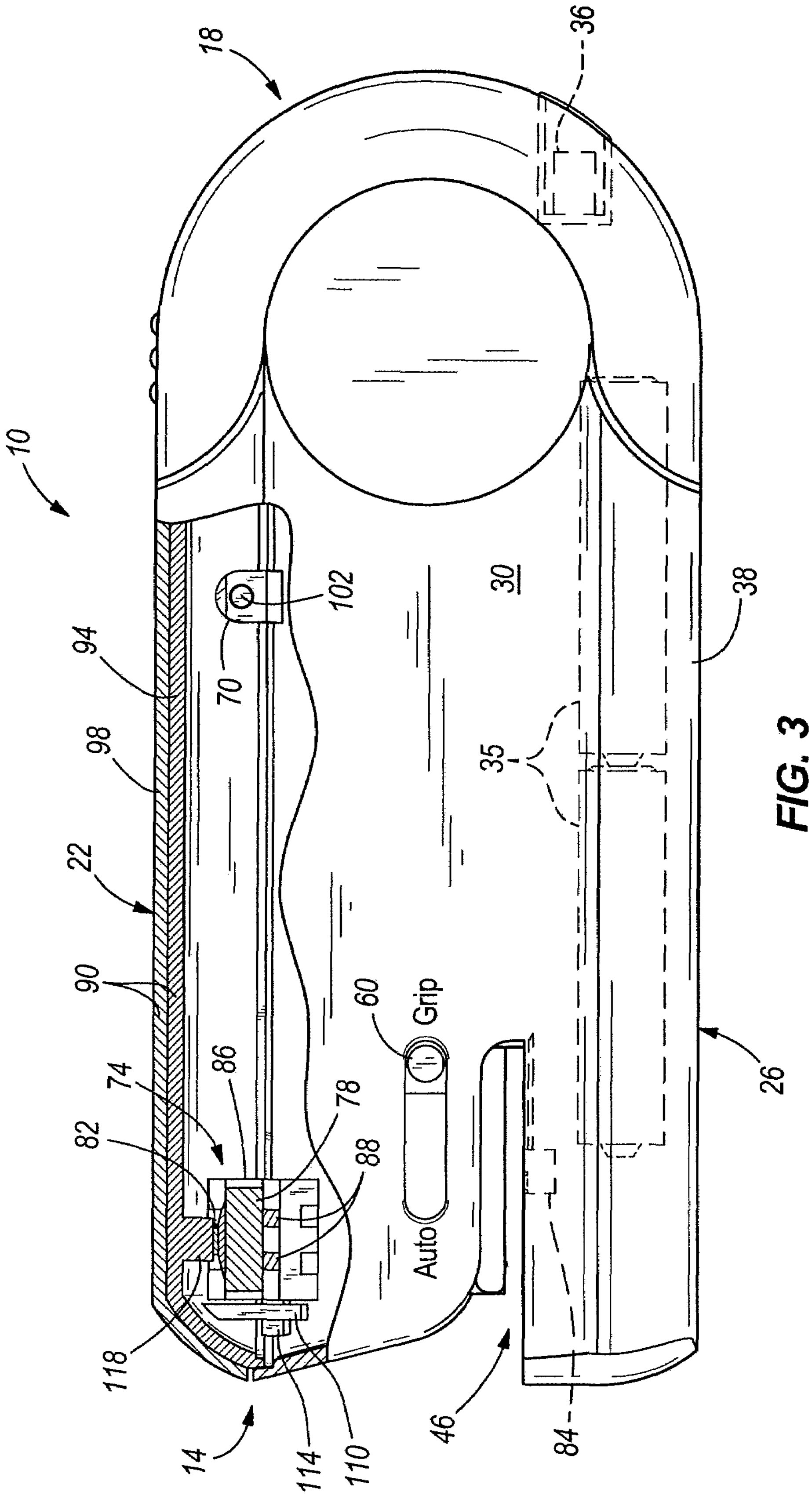
FIG. 3 is a partial section view of the stapler of FIG. 1 illustrating a non-actuation position.
Figure 4:
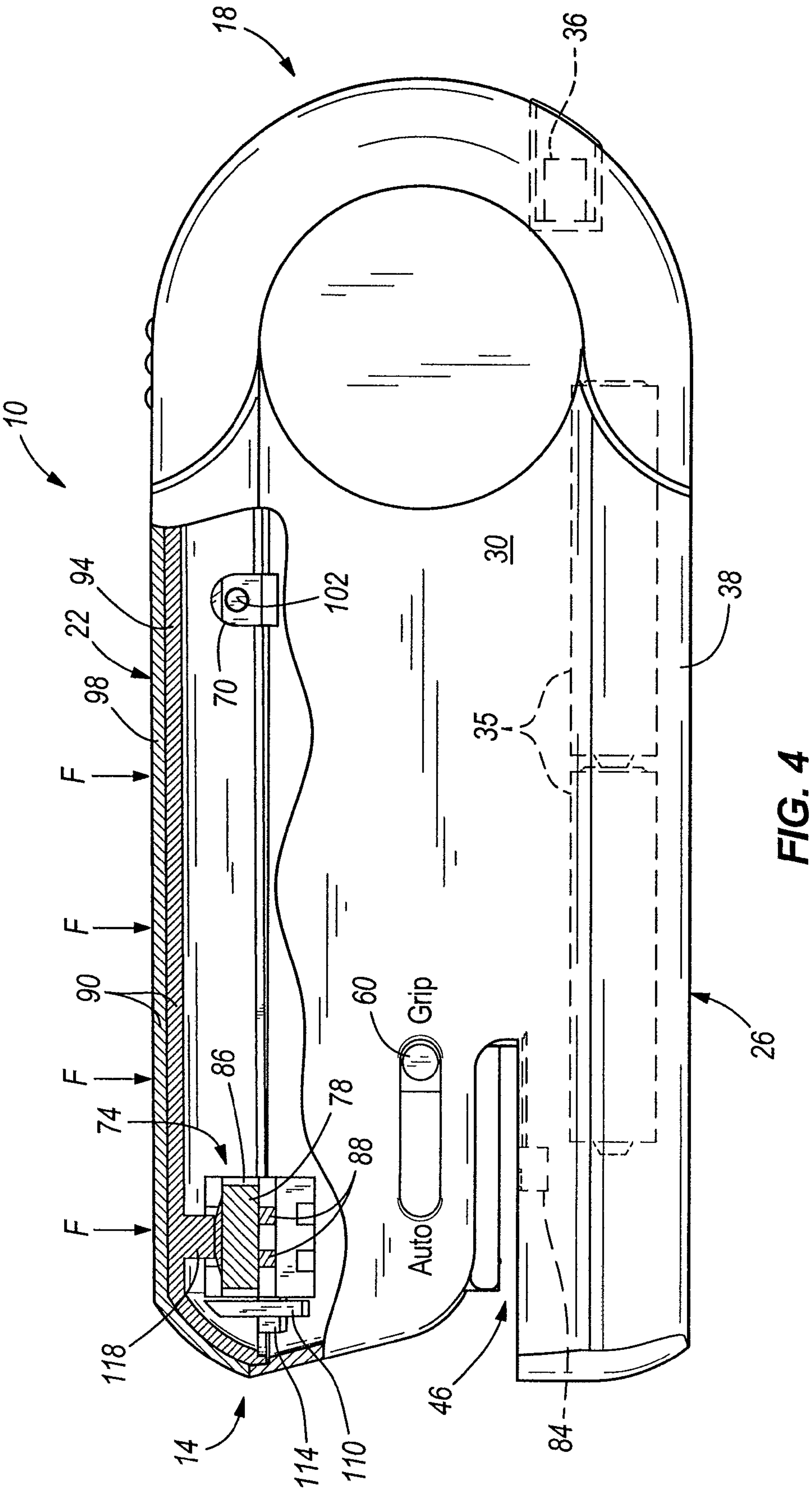
FIG. 4 is a partial section view of the stapler of FIG. I illustrating an actuation position.

The first housing portion 38 further defines a stack insertion throat 46 into which a stack of sheets S (see FIG. 5) is inserted for stapling. One side of the throat 46 is defined in part by a sheet support surface 50 that supports an anvil 54. The other side of the throat is defined in part by a magazine 58 that houses staples (not shown) and that has a staple ejection opening positioned above and in line with the anvil 54. As seen in FIGS. 3 and 4, a mode selection switch 60 is movably mounted near the throat 46 to select between automatic operation, wherein insertion of a stack of sheets S causes the stapler 10 to actuate, and trigger operation, where the user actuates the stapler 10 by squeezing the stapler 10, as will be described in greater detail below.

As illustrated in FIG. 2, the first housing portion 38 has an opening 62 defined in part by an upper edge 66 extending around a perimeter of the opening 62. A pair of mounts 70 extend above the upper edge 66, with one mount 70 on each side 30 of the stapler 10. In the illustrated embodiment, the mounts 70 are formed integrally with or coupled to an interior surface of the first housing portion 38 adjacent each respective side 30 of the stapler 10. The mounts 70 are closer to the rear end 18 than the front end 14 and, as best illustrated in FIGS. 3 and 4, are between the midpoint of the stapler's length and the three-quarter point of the stapler's length, taken in a direction from the front end 14 toward the rear end 18 of the stapler 10. In the illustrated embodiment, the ratio of the distance from the front end 14 to the mounts 70 versus the overall stapler length is about sixty percent and provides easy trigger movement, as will be described below.

The drive mechanism 42 supports a switch assembly 74 that, in the illustrated embodiment, extends at least partially above the upper edge 66 near the front end 14 of the stapler 10. The switch assembly 74 includes a switch 78 having a contact plunger 82. The specific type and configuration of the switch 78 is not critical to the invention, and any suitable switch can be used. The switch 78 is electrically connected to the drive mechanism 42 and is biased toward the non-depressed position (see FIG. 3) by an internal spring (not shown). When the contact plunger 82 is depressed (see FIG. 4), the circuit is closed to actuate the stapler 10. No additional buttons, limit switches, or sensors need to be pushed or tripped to actuate the stapler 10. Of course, additional buttons, limit switches, and sensors can be included on the stapler 10, if desired, to provide alternative or secondary means for actuating the stapler 10. For example, a photosensor 84 (shown schematically in FIGS. 3 and 4) may be used to detect the presence of a stack of sheets S to prevent erroneous manual stapler actuation while handling the stapler 10. The photosensor 84 also triggers actuation of the stapler 10 when operating in the automatic stapling mode.

The switch 78 is supported by upstanding walls 86 and support beams 88. The upstanding walls 86 and support beams 88 can be formed with the structure of drive mechanism 42, or can be separate components coupled to the housing 38 or mechanism 42.

The first housing portion 38 can be made of plastic or other suitable materials and can be configured to facilitate a user grasping and holding the stapler 10. The specific construction of the first housing portion 38 is not critical to the invention, and can be any number of separate parts having any number of suitable configurations.

The stapler 10 further includes a second housing portion 90 that, in the illustrated embodiment, includes a substantially rigid, elongated trigger member 94 that can be overmolded or otherwise coated with a resilient or semi-resilient membrane 98. The trigger member 94 is configured to fit over the opening 62 in the first housing portion 38 and to substantially match the contouring of the first housing portion 38 to substantially close the opening 62, thereby enclosing the drive mechanism 42. The trigger member 94 has a length greater than fifty percent of the overall length of the stapler 10, and closer to about seventy-five percent of the overall length of the stapler 10. In the illustrated embodiment, the trigger has a length of about sixty-eight percent of the overall length of the stapler 10.

As best illustrated in FIGS. 2-4, the trigger member 94 includes mounting posts 102 extending from an underside of the trigger member 94. The mounting posts 102 are positioned to engage the mounts 70 such that each mounting post 102 extends into a respective aperture 106 (see FIG. 2, only one is shown) in the corresponding mount 70 to create a pivotal connection between the trigger member 94 and the first housing portion 38. Of course, other suitable structural configurations (e.g., a ball and socket, a hinge, and the like) can be used to achieve the pivotal connection. Alternatively, the trigger member 94 need not pivot with respect to the first housing portion 38, but rather could undergo linear (e.g., up and down or front to back) or other movement with respect to the first housing portion 38.

The trigger member 94 also includes a pair of latch projections 110 extending from an underside of the trigger member 94 near the front end of the trigger member 94. The latch projections 110 engage respective shoulders 114 (see FIGS. 3 and 4, only one is shown) formed on or coupled to the interior surface of the first housing portion 38 adjacent each respective side 30 of the stapler 10. The engagement between the latch projections 110 and the respective shoulders 114 secures the front end of the trigger member 94 to the front end of the first housing portion 38 in a manner that permits the front end of the trigger member 94 to pivot or move downwardly (as shown in FIG. 4) with respect to the first housing portion 38, but that substantially prevents the trigger member 94 from lifting off the first housing portion 38 to expose the opening 62. Of course, other suitable securing methods can be substituted.

The trigger member 94 further includes a post 118 extending from an underside of the trigger member 94 in a location aligned with the plunger 82 of the switch 78 when the trigger member 94 is mounted on the first housing portion 38. As a user squeezes the stapler 10, thereby applying force to the trigger member 94 at substantially any location on the trigger member 94 (as represented by the multiple arrows F in FIG. 4), the trigger member 94 pivots about the mounting posts 102 such that the front end of the trigger member 94 and thus the post 118 moves downwardly, as illustrated in FIG. 4. Downward movement of the post 118 depresses the plunger 82, thereby closing the electrical circuit to actuate the stapler 10. As the user relaxes the grip on the stapler 10, the plunger 82 is biased (by the internal spring of the switch 78) back toward the position illustrated in FIG. 3, causing the trigger member 94 to pivot upwardly to the non-actuated position shown in FIG. 3.

As best seen in FIGS. 2-4, the membrane 98 can be overmolded or otherwise coupled over the trigger member 94 to provide a more pleasing, comfortable, and intuitive gripping surface. In the illustrated embodiment, the membrane 98 is made of sanoprene, but other similar materials can also be used. Those skilled in the art will understand that portions of the first housing portion 38 may also be overmolded or otherwise covered with sanoprene to provide comfortable gripping surfaces at other locations on the stapler (e.g., the bottom 26 and portions of the sides 30).

By incorporating the trigger member 94, the stapler 10 provides a powered stapler that can be held in a single hand of the user and that can be operated in a manner similar to manually-operated, hand-held staplers, i.e., by squeezing the stapler 10 in the user's hand. However, the fact that the stapler 10 is a powered stapler significantly reduces the human force input required to staple the stack of sheets. The amount of human input force required to actuate the stapler 10 can be varied as desired based on the force required to depress the plunger 82 (e.g., different switches 78 can be selected), and the mechanical advantage gained based on the construction of the trigger member 94 (e.g., the effective lever arm length between the post 118 and the mounting posts 102 can be varied).

The configuration of the trigger member 94, and more specifically the fact that the trigger member 94 has a length extending over a significant portion of the overall length of the stapler 10 (i.e., at least about fifty to seventy-five percent of the stapler's overall length) allows the user to simply squeeze his or her hand without the need to accurately position a single finger on a small actuation button. Instead of focusing attention on depressing a small actuation button, the user can instead focus on the position of the staple on the stack of sheets S, as controlled by the position of the user's hand. This provides the user with a much more intuitive feel for stapling, and provides the user with much more control and accuracy over staple placement.

Even when the stapler 10 is placed on a desktop or other support surface, the trigger member 94 allows the user to simply tap virtually anywhere on the top 22 of the stapler 10 along the length of the trigger member 94 to fire a staple, instead of having to more accurately align a finger with and depress a small manual actuation button. The mode selection switch 60 also allows the user to select an automatic stapling mode when appropriate.

While the trigger member 94 has been described and illustrated as being part of the second housing portion 90, it is to be understood that the trigger member 94 need not form part of the stapler's housing, but rather could be a separate trigger mounted to an outer surface of the stapler's housing.

Various features of the invention are set forth in the following claims.

The invention claimed is:

1. A hand-actuated powered stapler having a front end adjacent to a staple ejection location and a rear end opposite the front end, the stapler comprising:

an electrically operable staple drive mechanism;

a housing at least partially surrounding the drive mechanism; and a trigger member pivotally connected to the housing at a point closer to the rear end of the stapler than to the front end of the stapler;

wherein the stapler is actuated by creating relative movement between the trigger member and the housing.

2. The powered stapler of claim 1, wherein the stapler has an overall length measured from the front end to the rear end, and wherein the trigger member is pivotally connected to the housing at a location between a midpoint of the stapler's overall length and about seventy-five percent of the stapler's overall length.

3. The powered stapler of claim 1, wherein the stapler has an overall length, and wherein the trigger member has a length greater than fifty percent of the overall length of the stapler.

4. The powered stapler of claim 3, wherein the trigger member has a length of between about fifty percent of the overall length of the stapler and about seventy-five percent of the overall length of the stapler.

5. The powered stapler of claim 1, wherein the housing defines an opening exposing at least a portion of the drive mechanism, and wherein the trigger member is configured to substantially close the opening.

6. The powered stapler of claim 1, wherein the housing includes a first housing portion, and wherein the trigger member defines a second housing portion at least partially surrounding the drive mechanism such that, the first and second housing portions substantially enclose the drive mechanism.

7. The powered stapler of claim 1, wherein the trigger member is at least partially covered with a resilient membrane.

8. The powered stapler of claim 1, further comprising a mode selection switch operable to selectively permit actuation of the stapler upon movement of the trigger member with respect to the housing.

9. The powered stapler of claim 1, further comprising a switch electrically connected to the drive mechanism, and wherein movement of the trigger member with respect to the housing activates the switch to actuate the drive mechanism.

10. The powered stapler of claim 9, wherein the trigger member includes a post configured to engage a contact plunger on the switch to activate the switch, and wherein movement of the trigger member with respect to the housing engages the post with the contact plunger.

11. The powered stapler of claim 1, wherein the trigger member has a length such that a user who grasps and squeezes the stapler will actuate the stapler without the need to accurately position a finger on an actuation button.

12. A hand-actuated powered stapler comprising:

an electrically operable staple drive mechanism;

a housing at least partially surrounding the drive mechanism; and a trigger member movably coupled to the housing;

wherein the stapler is actuated by creating relative movement between the trigger member and the housing; and wherein the stapler has an overall length, and wherein the trigger member has a length greater than fifty percent of the overall length of the stapler.

13. The powered stapler of claim 12, wherein the trigger member has a length of between about fifty percent of the overall length of the stapler and about seventy-five percent of the overall length of the stapler.

14. The powered stapler of claim 12, wherein the housing defines an opening exposing at least a portion of the drive mechanism, and wherein the trigger member is configured to substantially close the opening.

15. The powered stapler of claim 12, wherein the housing includes a first housing portion, and wherein the trigger member defines a second housing portion at least partially surrounding the drive mechanism such that, the first and second housing portions substantially enclose the drive mechanism.

16. The powered stapler of claim 12, wherein the trigger member is at least partially covered with a resilient membrane.

17. The powered stapler of claim 12, further comprising a mode selection switch operable to selectively permit actuation of the stapler upon movement of the trigger member with respect to the housing.

18. The powered stapler of claim 12, further comprising a switch electrically connected to the drive mechanism, and wherein movement of the trigger member with respect to the housing activates the switch to actuate the drive mechanism.

19. The powered stapler of claim 18, wherein the trigger member includes a post configured to engage a contact plunger on the switch to activate the switch, and wherein movement of the trigger member with respect to the housing engages the post with the contact plunger.

20. The powered stapler of claim 12, wherein the trigger member is pivotally connected to the housing.

21. The powered stapler of claim 20, wherein the overall length of the stapler is measured from a front end of the stapler to a rear end of the stapler, and wherein the trigger member is pivotally connected to the housing at a location between a midpoint of the stapler's overall length and about seventy-five percent of the stapler's overall length.

22. A hand-actuated powered stapler comprising:

an electrically operable staple drive mechanism;

a housing at least partially surrounding the drive mechanism; and a trigger member movably coupled to the housing;

wherein the stapler is actuated by creating relative movement between the trigger member and the housing; and wherein the housing includes a first housing portion, and wherein the trigger member defines a second housing portion at least partially surrounding the drive mechanism such that, the first and second housing portions substantially enclose the drive mechanism.

23. The powered stapler of claim 22, wherein the trigger member is at least partially covered with a resilient membrane.

24. The powered stapler of claim 22, further comprising a mode selection switch operable to selectively permit actuation of the stapler upon movement of the trigger member with respect to the housing.

25. The powered stapler of claim 22, further comprising a switch electrically connected to the drive mechanism, and wherein movement of the trigger member with respect to the housing activates the switch to actuate the drive mechanism.

26. The powered stapler of claim 25, wherein the trigger member includes a post configured to engage a contact plunger on the switch to activate the switch, and wherein movement of the trigger member with respect to the housing engages the post with the contact plunger.

27. The powered stapler of claim 22, wherein the trigger member has a length such that a user who grasps and squeezes the stapler will actuate the stapler without the need to accurately position a finger on an actuation button.

28. The powered stapler of claim 22, wherein the trigger member is pivotally connected to the housing.

* * * * *

UNITED STATES PATENT AND TRADEMARK OFFICE

CERTIFICATE OF CORRECTION

PATENT NO. : 7,571,537 B2
APPLICATION NO. : 11/110643
DATED : August 11, 2009
INVENTOR(S) : Adams et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1053 days.

Signed and Sealed this

Seventh Day of September, 2010

David J. Kappos

*Director of the United States Patent and Trademark Office*